(12) United States Patent (10) Patent No.: US 8,457,274 B2
Arodzero et al. (45) Date of Patent: Jun. 4, 2013

(54) SYSTEM AND METHODS FOR INTRAPULSE MULTI-ENERGY AND ADAPTIVE MULTI-ENERGY X-RAY CARGO INSPECTION

(75) Inventors: Anatoli Arodzero, Billerica, MA (US); Martin Rommel, Lexington, MA (US); Aleksandr Saverskiy, North Andover, MA (US); Rajen Sud, Burlington, MA (US)

(73) Assignee: American Science and Engineering, Inc., Billerica, MA (US)

( * ) Notice: Subject to any disclaimer, the term of this patent is extended or adjusted under 35 U.S.C. 154(b) by 0 days.

(21) Appl. No.: 13/274,683

(22) Filed: Oct. 17, 2011

(65) Prior Publication Data

US 2012/0093289 A1 Apr. 19, 2012

Related U.S. Application Data

(60) Provisional application No. 61/394,052, filed on Oct. 18, 2010.

(51) Int. Cl.
*G01N 23/02* (2006.01)

(52) U.S. Cl.
USPC .............................. 378/57; 378/53; 378/98.9

(58) Field of Classification Search
USPC ........................................... 378/53, 57, 98.9
See application file for complete search history.

(56) References Cited

U.S. PATENT DOCUMENTS

| | | | |
|---|---|---|---|
| 5,258,612 A | 11/1993 | Clark et al. | 250/226 |
| 5,524,133 A | 6/1996 | Neale et al. | 378/53 |
| 6,069,936 A | 5/2000 | Bjorkholm | 378/98.9 |
| 6,342,701 B1 | 1/2002 | Kash | 250/458.1 |
| 7,257,188 B2 | 8/2007 | Bjorkholm | 378/53 |
| 7,453,987 B1 | 11/2008 | Richardson | 378/98.9 |
| 7,588,083 B2 | 9/2009 | Newman | 166/255.1 |
| 7,623,614 B2 | 11/2009 | Shefsky | 378/2 |
| 2008/0253520 A1* | 10/2008 | Boyden et al. | 378/86 |

OTHER PUBLICATIONS

Novikov, et al., "Dual Energy Method of Material Recognition in High Energy Introscopy Systems", *Internal Workshop on charged particle Linear Accelerators*, pp. 93-95 (1999).
Ryzhikov, et al., "X-Ray multi-energy radiography with 'scintillator-photodiode' detectors", *Nuclear Instruments and Methods in Physics Research A*, vol. 505, pp. 549-51 (2003).
Sukovic, et al., "Basis Material DecompositionUsing Triple-Energy X-ray Computed Tomography", *IEEE Instr. and Meas. Technology Conf. Venice*, vol. 3, pp. 1481-1483 (1999).
Korean Intellectual Property Office, Officer Sang Wook Kim, International Search Report and Written Opinion, PCT/US2011/056534, date of mailing Mar. 2, 2012, 8 pages.

* cited by examiner

*Primary Examiner* — Glen Kao
(74) *Attorney, Agent, or Firm* — Sunstein Kann Murphy & Timbers LLP

(57) ABSTRACT

Methods and systems for x-ray inspection of an object using pulses whose spectral composition varies during the course of each pulse. A temporal sequence of pulses of penetrating radiation is generated such that the spectral content of each pulse evolves with time. The pulses are formed into a beam that is scanned across the object and detected after traversing the object. The detector signal is processed to derive at least one material characteristic of the object, such as effective atomic number, on the basis of temporal evolution of the detector signal during the course each pulse of the sequence of pulses. The time intervals may be predetermined, or else adapted based on features of the detected signal.

28 Claims, 14 Drawing Sheets

SYSTEM AND METHODS FOR INTRAPULSE MULTI-ENERGY AND ADAPTIVE MULTI-ENERGY X-RAY CARGO INSPECTION

The present application claims priority from U.S. Provisional Patent Application Ser. No. 61/394,052, filed Oct. 18, 2010, and incorporated herein by reference.

TECHNICAL FIELD

The present invention relates to methods and apparatus for cargo inspection with penetrating radiation, and, more particularly, to inspection systems employing pulsed X-ray sources with non-stationary spectrum and intensity, providing enhanced material discrimination.

BACKGROUND ART

X-ray security inspection systems for the inspection of cargo and shipping containers typically use transmission radiographic techniques. FIG. 1A depicts a cargo inspection system employing such a technique. A fan-shaped beam 12 of penetrating radiation, emitted by a source 14, is detected by elements of a detector array 16 distal to a target object, here truck 10, is used to produce images of the target object. The thickness of material to be penetrated by the X-rays may exceed 300 mm of steel equivalent in some cases. To insure the required penetration, inspection systems typically use X-rays with a maximum energy of several MeV, currently up to about 9 MeV. X-rays in excess of 1 MeV are frequently referred to as hard X-rays or high-energy X-rays. While the invention described herein pertains to any penetrating radiation, it may be described, purely as a matter of heuristic convenience, in terms of high-energy X-rays.

Information (such as mass absorption coefficient, effective atomic number $Z_{eff}$, electron density, etc.) with respect to the material composition of the contents of objects may be obtained on the basis of the interaction of X-rays with the material, and, more particularly, by illuminating the material with X-ray beams having energy spectra with more than one distinct energy endpoint (peak energy), or by employing energy discriminating detectors. Dual energy methods of material discrimination are widely used in X-ray inspection systems for security control of hand luggage in customs and other security checkpoints. Dual energy inspection is discussed in the following references, for example, which are incorporated herein by reference:

U.S. Pat. No. 5,524,133, Neale et al., "Material Identification using X-Rays" (1996) (hereinafter, "Neale '133")

U.S. Pat. No. 7,257,188, Bjorkholm, "Dual Energy Scanning of Contents of an Object" (2005)

U.S. Pat. No. 6,069,936, Bjorkholm, "Material Discrimination using Single-Energy X-Ray Imaging System" (2000)

More recently, the dual energy methods have been extended to high-energy inspection systems for cargo containers, where they are less effective due to the weaker Z-dependence of the dominant interaction.

In the practice of dual-energy inspection, X-ray transmission data of an inspected object are obtained for both energies, and processed by computer, whereupon a resulting image is displayed on a monitor, typically in a special color palette that facilitates visual identification of contraband or hazardous materials. More particularly, special computer software may identify various materials and artificial colors may be assigned to various values of $Z_{eff}$.

A typical energy range for the inspection of smaller objects is below 0.5 MeV, taking advantage of the strong Z-dependence of the X-ray attenuation coefficient due to the prevalence of the photoelectric interaction (characterized by a cross-section, $\sim Z^4$-$Z^5$) at lower energies. In the range of 1-10 MeV, however, X-ray interaction is dominated by the Compton effect with its weak dependence of attenuation coefficient (mass absorption) on the atomic number: $\mu_c \sim Z/A$ (which is approximately constant and equal to 0.5), where Z denotes atomic number, and A denotes atomic mass, which is to say that the mass absorption coefficient is largely Z-insensitive in the energy regime dominated by Compton scatter. The relative importance of the three major X-ray interactions for different Z-values at energies between 10 keV and 100 MeV is shown in FIG. 1B.

Expanding upon the principles of dual-energy materials discrimination, composition analysis and explosives detection using triple energy X-ray transmission were the subject of a 1993 Department of Transportation SBIR grant to Advanced Optical Technologies, while application of triple energy in the context of X-ray computed tomography was studied by Dukovic et al., in "*Basis material decomposition using triple-energy reconstructions for X-ray tomography*," IEEE Instr. and Meas. Technology Conf., Venice, vol. 3, pp. 1481-83 (1999).

As an example of dual-energy materials discrimination, Neale '133 discusses scanning systems for large objects such as freight in a container or on a vehicle. In the system depicted in FIG. 14 of Neale '133, two stationary sources of X-ray radiation are provided, each source emitting a beam that is collimated into a fan beam. The sources face adjacent sides of the freight and the fan beams are perpendicular to each other. A stationary detector array is located opposite each source, on opposite sides of the freight, to receive radiation transmitted through the freight. In addition, X-ray radiations of two different energies are emitted by each source. One energy is significantly higher than the other. For example, energies of 1 MeV and 5 or 6 MeV may be used. A ratio of the mean number of X-rays detected at each energy endpoint by the detector array as a whole for each slice or by the individual detectors of the array is determined and compared to a look up table to identify a mean atomic number corresponding to the ratio. The material content of the freight is thereby determined.

Tandem-detector configurations, in which a rearward detector is used to detect higher-energy photons that have traversed a forward low-energy detector, may be used for dual-energy inspection at low X-ray energies. However, tandem-detector configurations tend to be ineffectual for inspection at energies above ~1 MeV, because the beam is typically so hardened by traversal of the intervening cargo that there is little differential detection between the detector elements. Moreover, the signals from each element of a tandem detector are also typically cross-contaminated by Compton scattered photons: the forward low-energy detector signal is contaminated by backscattered photons, whereas the signal produced in the rearward high-energy element is contaminated by forward scattered photons.

The use of dual energy beams, however, gives rise to ambiguity in determining the atomic number of a sample. In particular, the teachings of Ishkhanov, et al., "Multi-beam methods of atomic number discrimination," Preprint, SINP, Moscow, (2005) (in Russian), and Ishkhanov, et al., "Multiple-Beam Method for Object Scanning," *Bulletin of the Russian Academy of Science: Physics,* 2008, Vol. 72, No. 6, 859-62, (2008) present the probability distribution, as shown in FIG. 8, infra, of determining the effective atomic number for a uranium (Z=92) object 4.5×4.5×4.5 cm³ in size, as simulated for double end-point energy (thin line) and triple end-point energy (bold line) methods. It is evident that a substantial probability is attributed to an incorrect range in the vicinity of Z~68.

A further disadvantage of currently practiced multiple-energy techniques involves the use of linear accelerators (linacs) to generate X-ray pulses in the MeV range used for cargo inspection. Linac pulses are typically separated by two milliseconds, or more, during the course of which interval the position of the beam has moved relative to the cargo. It would be preferable, however, to ensure that all energies used in the analysis of cargo characteristics sample exactly the same part of the cargo. It would be desirable, therefore, to provide a method for applying multiple energy techniques in the 4-10 MeV range for recognition of groups of materials according to their effective atomic number without recourse to multiple beams, separated in space or time.

In cargo inspection applications, the wide range of densities in the inspected volume may cause the X-ray attenuation, on traversal of the cargo, to vary by as much as a factor of 100,000. This variation requires an equivalent dynamic range for the detection system, a daunting challenge to effective inspection techniques.

SUMMARY OF EMBODIMENTS OF THE INVENTION

In accordance with embodiments of the invention, methods and apparatus are provided for inspecting an object with x-rays. In one embodiment of the invention, a method for x-ray inspection of an object has steps of:

a. generating a temporal sequence of pulses of penetrating radiation, each pulse characterized by an onset and by a spectral content that evolves with time subsequent to the onset;

b. forming the pulses of penetrating radiation into a beam scanned across the object;

c. detecting penetrating radiation from the beam that has traversed the object and generating a detector signal; and d. processing the detector signal to derive at least one material characteristic of the object on a basis of temporal evolution of the detector signal of at least one pulse of the sequence of pulses.

In accordance with further embodiments, the step of detecting penetrating radiation may include distinguishing signal acquired during distinct time intervals of each pulse. The distinct time intervals of each pulse may be tailored in correspondence to distinct spectral content of the pulses of penetrating radiation. The time intervals may be predetermined prior to operation, or may be determined adaptively during operation. Alternatively, they may be based on a threshold value of the detector signal.

In other embodiments of the invention, processing the detector signal may include integrating the detector signal separately over the distinct time intervals of each pulse, as well as photon counting or acquiring threshold crossing times. The step of detecting may include preprocessing of the detector signal, as well as deriving a plurality of detector signal channels.

In further embodiments of the invention, the pulses of penetrating radiation are characterized by an end-point energy in a range up to 10 MeV. The pulses may be generated by an accelerator.

In yet further embodiments, the step of detecting penetrating radiation may be performed by one or more scintillation detector, direct conversion detector, or Cherenkov detector, or by a detector responsive to both Cherenkov and scintillation light. The specified characteristic derived may be chosen from a group of material characteristics of the object comprising an effective atomic number and an electron density.

In other embodiments of the invention, the intervals of time are selected to provide two energy bins, or three energy bins. The method may have an additional step of determining at least one time during an acquired detector signal corresponding to a predetermined threshold. The step of processing may be performed for a plurality of detectors on a detector-by-detector basis, and the selection of time intervals may be modified in response to an ambiguity in a determination of a material characteristic.

In accordance with an alternate embodiment of the invention, an X-ray inspection apparatus is provided. The X-ray inspect system has a source of penetrating radiation for generating a temporal sequence of pulses of penetrating radiation, where each pulse characterized by an onset and by a spectral content that evolves with time subsequent to the onset. Additionally, the system has a detector for detecting penetrating radiation from the beam that has traversed the object and for generating a detector signal, and a processor for receiving the detector signal and deriving at least one material characteristic of the object on a basis of temporal evolution of the detector signal of at least one pulse of the sequence of pulses.

In other embodiments of the invention, there may be more than a single detector element. The source of penetrating radiation may be a linac, and each pulse of penetrating radiation includes an energetically monotonic ramp. The detector, in some embodiments, may have a preprocessor for distinguishing signal acquired during distinct time intervals of each pulse.

BRIEF DESCRIPTION OF THE DRAWINGS

The foregoing features of the invention will be more readily understood by reference to the following detailed description, taken with reference to the accompanying drawings, in which:

FIG. 3B depicts predetermined time intervals associated with low- and high-end-point energies in a dual-energy scenario in accordance with one embodiment of the present invention, while

DETAILED DESCRIPTION OF EMBODIMENTS OF THE INVENTION

Figure 1A:
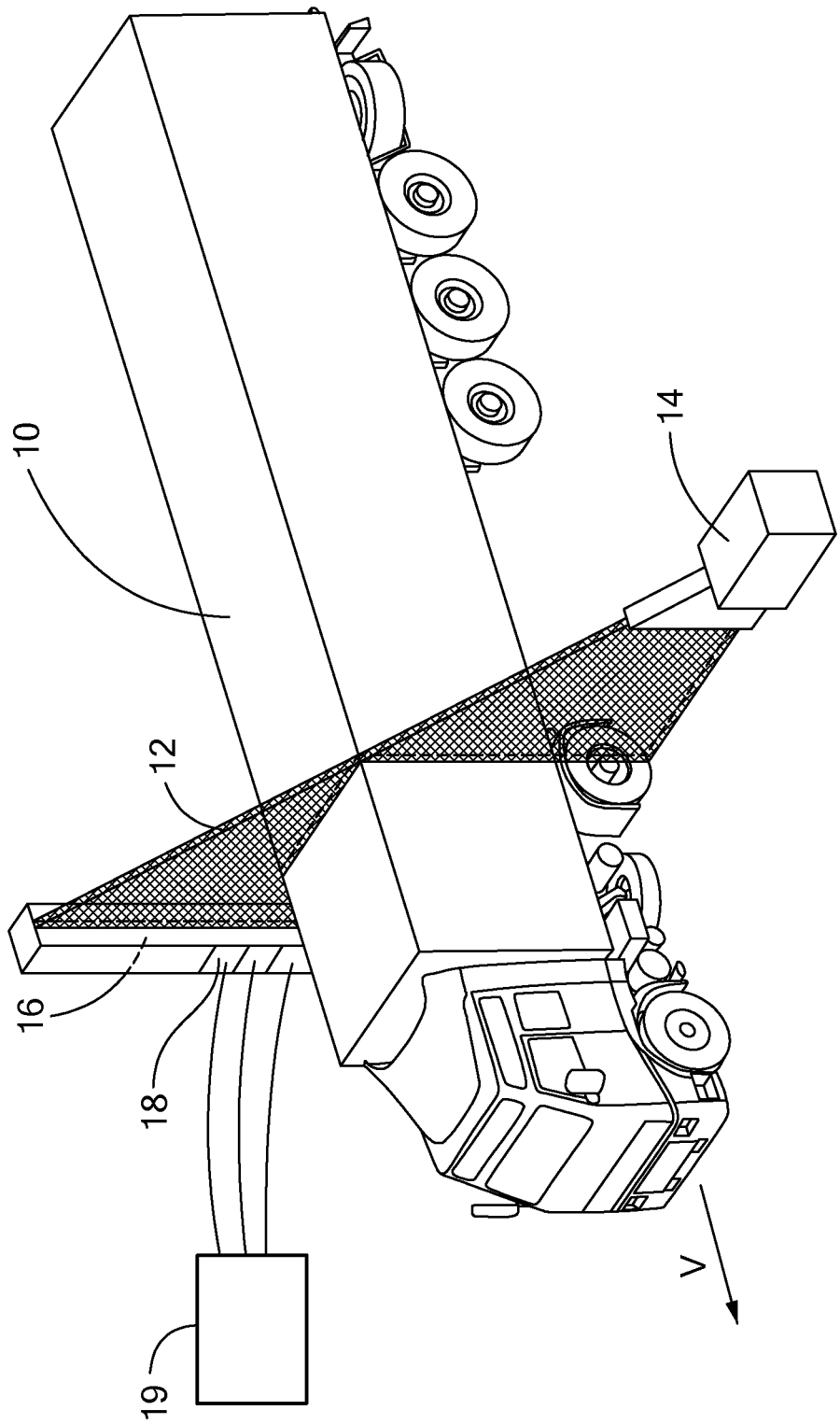
FIG. 1A depicts a typical high-energy transmission X-ray inspection system, in the context of which embodiments of the present invention are advantageously applied.
Figure 1B:
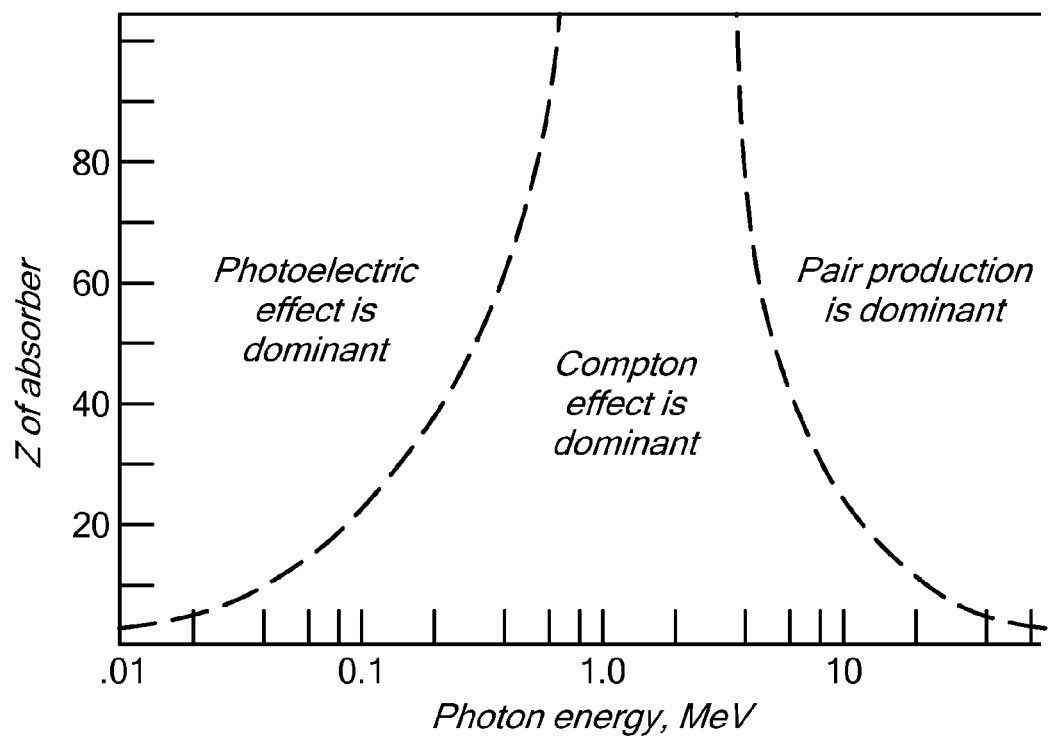
FIG. 1B depicts the relative importance of the three major X-ray interactions for different Z-values at energies between 10 keV and 100 MeV.

Definitions: as used herein and in any appended claims, the following terms shall have the meanings indicated unless the context requires otherwise.

The term "multiple-energy" shall refer to an X-ray inspection modality in which differential transmission through a medium by X-rays of distinct spectral composition is used to characterize the medium.

An X-ray detector is referred to herein, and in any appended claims, as "fast" if the detector response time is much smaller than the duration of X-ray pulses employed therewith, thus a "fast" detector can resolve the temporal profile of a ramped-energy X-ray pulse.

"Temporal bins" of a pulse refer to specified temporal segments, which need not be contiguous, over which a signal is integrated and associated with a particular measured quantity such as the signal associated with a particular end-point energy range. When the temporal bins are chosen to reflect a particular range of end-point energies, they may be referred to as "energy bins."

The "instantaneous intensity" of an x-ray pulse shall denote the X-ray dose rate in the pulse as measured by a detector, in accordance with the detection mode of the detector.

The "instantaneous energy" of an X-ray pulse shall denote the integral of the spectral density of the pulse at a specified time.

The "mass attenuation coefficient," denoted $\mu/\rho$, is defined, for a medium, on the basis of the X-ray intensity I transmitted through the medium relative to the incident intensity $I_0$, according to $I/I_0 = \exp[-(\mu/\rho)x]$, where x is the areal density of the probed medium in units of mass per unit area. Mass attenuation coefficients between 100 keV and 20 MeV are shown in FIG. 1C for several materials. The term "mass absorption coefficient" may be used, herein, interchangeably with the term "mass attenuation coefficient," disregarding any distinctions in meaning.

When "attenuation coefficient" is used herein, it refers to "mass attenuation coefficient," as defined above, unless the context requires otherwise.

The "effective atomic number," as used herein, is the "average" atomic number, averaged over a probed column of material, where the average is taken as typical in the context and energy range in which the measurement is taken.

The term "X-ray generator" shall signify a device that produces X-rays, including, without limitation, X-ray tubes, or Bremsstrahlung targets impinged upon by energetic particles, without regard for the mechanism used for acceleration of the particles, including, without limitation, linacs, etc.

The term "saturation," as used herein in the context of detection, refers to the condition wherein a detector response ceases to grow monotonically with increasing incident energy. The detector response may flatten or decline, depending upon the type of detector employed.

The systems and methods described herein may be described in terms of X-rays, however the applicability of the teachings to other spectral ranges is clear, and encompasses, within the scope of the invention, all manner of penetrating radiation.

Various embodiments of the invention described herein employ variation of the spectral content of an X-ray pulse during the course of the pulse to discriminate differences in X-ray transmission of a medium in different energy regimes. Approaches taught in accordance with the present invention are particularly advantageous in cases where high speed of scanning is required, such as train or high-throughput scanners.

Ramped-energy X-ray pulses are characterized by a Bremsstrahlung end-point energy which sweeps from one, typically lower, to another, typically higher, energy level. Concurrently with the sweeping of the endpoint energy, the X-ray flux may increase from a minimum to a maximum. In various embodiments of the present invention, the X-ray pulses are characterized by an end-point energy that is a function of time, of which a monotonic ramp is one example.

Figure 1C:
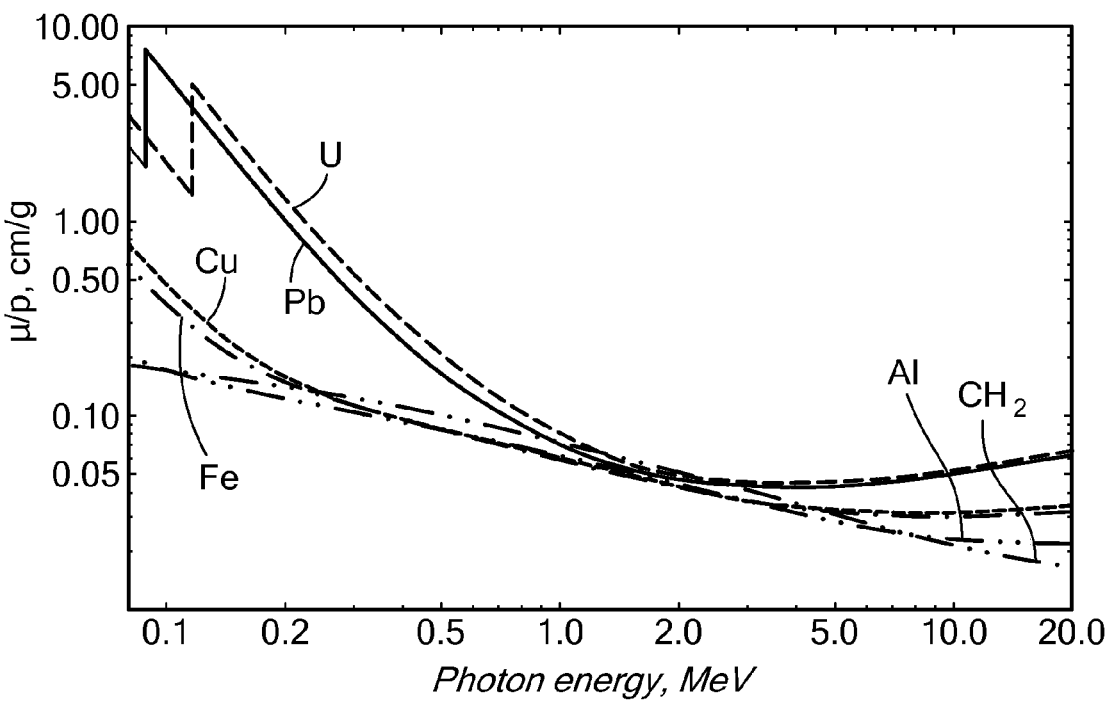
FIG. 1C shows plots of mass attenuation coefficients between 100 keV and 20 MeV for several materials.

One X-ray transmission inspection system used for interrogating the material composition of matter, such as the contents of containers or vehicles, is depicted in FIG. 1A. A source 14 emits a beam 12 of penetrating radiation which traverses an inspected object such as vehicle 10. Particular contents of the object may be discriminated and characterized on the basis of the transmission of penetrating radiation through the object and its detection by detector array 16 and its individual detector modules 18. (As used herein, the term "detector module" refers to a detector element in conjunction with its associated preprocessing electronics.) Signals from each of the detector modules, suitably pre-processed, provide inputs to processor 19, where material characteristics are computed. The discrimination of material characteristics may be improved by the use of X-ray beams with energy spectra having two, or more different energy endpoints (peak energies) that interact differently with the interrogated matter. The interaction between an X-ray beam and matter is material-dependent. For example, consider two X-ray beams with peak energies of 4 MeV and 8 MeV, respectively. For an X-ray beam having peak energy of 4 MeV, the X-ray radiation will be attenuated mainly by Compton scattering process. There is only a little pair production over most of that spectrum. For an X-ray beam having peak energy of 8 MeV, concurrently with Compton scattering, more pair production is induced. A ratio of the transmitted radiation detected at two energy endpoints may be indicative of the atomic numbers of the material through which the radiation beam passes.

Embodiments of the present invention may utilize the time evolution of the energy spectrum of a linac pulse. A linac-which is configured to provide a ramped buildup of energy and intensity is preferred for purposes of the present invention. In preferred embodiments of the present invention, the pulses of penetrating radiation are characterized by an end-point energy in a range up to 10 MeV.

Figures 2A, 2B:
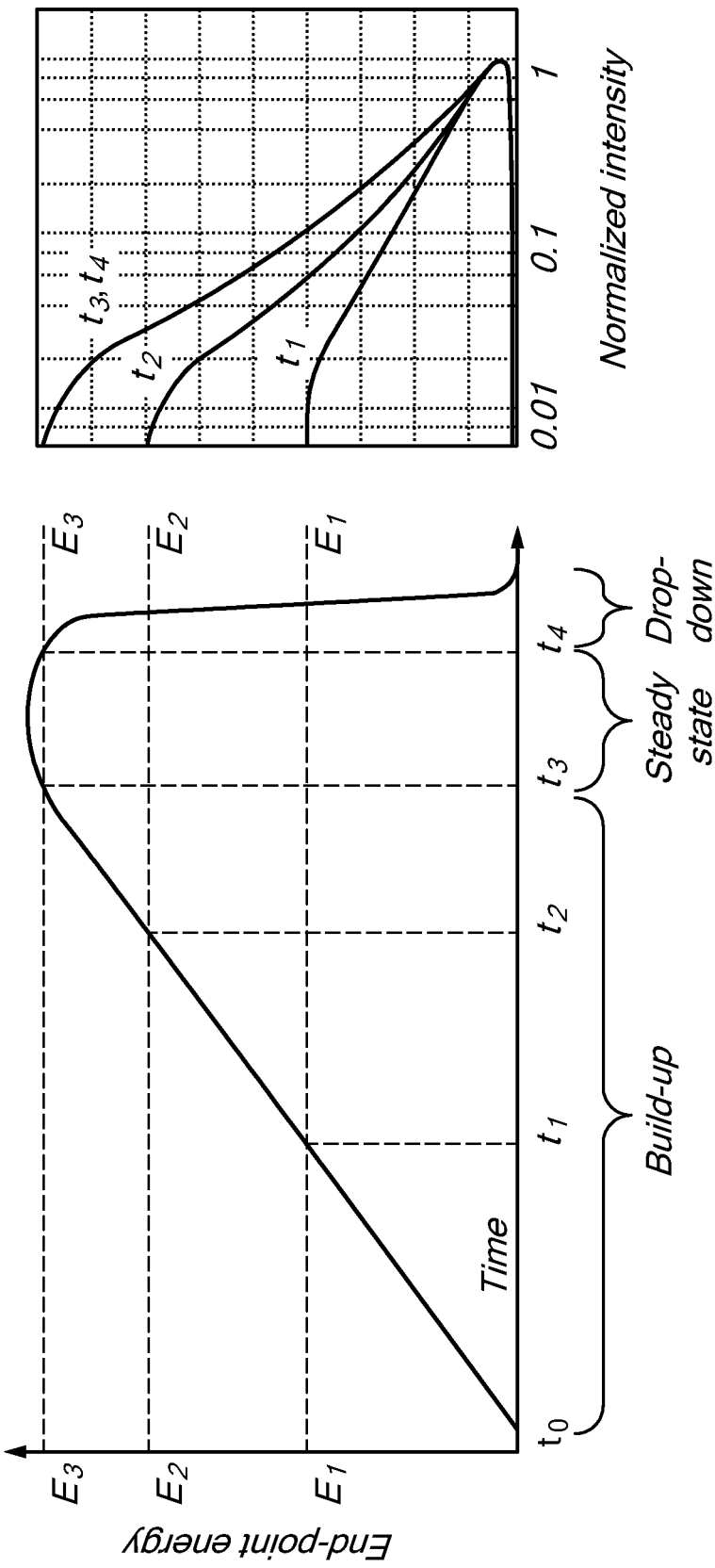
FIG. 2A plots an example of time evolution of the endpoint energy of a linac-generated X-ray pulse, while FIG. 2B plots the normalized Bremsstrahlung spectra of the pulse at the indicated times during the pulse.

Referring, now, to FIGS. 2A and 2B, a temporal profile of intrapulse X-ray end-point energy is shown in FIG. 2A, corresponding to the electron energy of a linac-based X-ray source during the course of a pulse. The linac RF power, and, consequently, the accelerating field, ramp up during the transient period from an onset $t_0$ of X-ray emission through $t_3$, where $t_0$ refers to the instant of time corresponding to onset of the pulse. In conjunction with the ramp-up of RF power and accelerating field, both the linac current and end-point energy also increase, thus the mix of emitted x-rays (approximated by Kramer's Law) includes a greater proportion of higher-energy x-rays during the "steady-state" period of high-current, from $t_3$ to $t_4$, than during the ramp-up or drop-down portions of each pulse. In preferred embodiments of the invention, the X-ray source may be a linear accelerator which has been configured to produce X-ray pulses shaped such that the end-point energy sweep and flux increase are substantially linear in time over some period. The end-point energy, in such cases, increases over time during the build-up period, which may be followed by a period of nearly constant end-point energy.

Since the endpoint energy varies with time, the spectral content of the pulse varies similarly, as shown in FIG. 2B for the designated times, such that the process may be referred to herein as the "temporal evolution of spectral content."

In accordance with preferred embodiments of the present invention, the non-stationary, transient time-energy structure of the radiation pulse generated by an X-ray generator, such as a linac, is employed, in conjunction with a multi-window approach of measuring the signal produced by a fast detector with a response time short on the time scale of corresponding portions of the pulse over which detection is integrated. As an example, $\tau_{Decay}$ signifies a scintillation decay time characterizing a detector, $T_{integration}$ is the time over which a detector signal is integrated, and $T_{X-ray}$ refers to the overall duration of the x-ray pulse. Thus, the condition under which embodiments of the present invention are operative are those in which $\tau_{decay} < T_{integration} < T_{x-ray}$. In accordance with certain embodiments of the invention, the detector may be a Cherenkov detector, in which the duration of the Cherenkov flash in the radiator is very prompt. In those cases, $\tau_{Cherenkov} < T_{integration} < T_{x-ray}$.

Figure 3A:
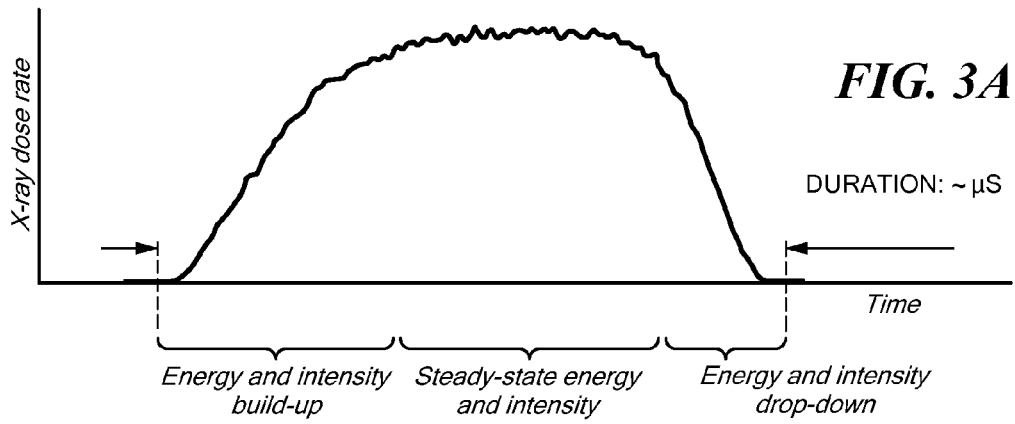
FIG. 3A plots the dose rate from a linac-based X-ray source used in practicing embodiments of the present invention, shown as a function of time, over a period of several microseconds.
Figure 3B:
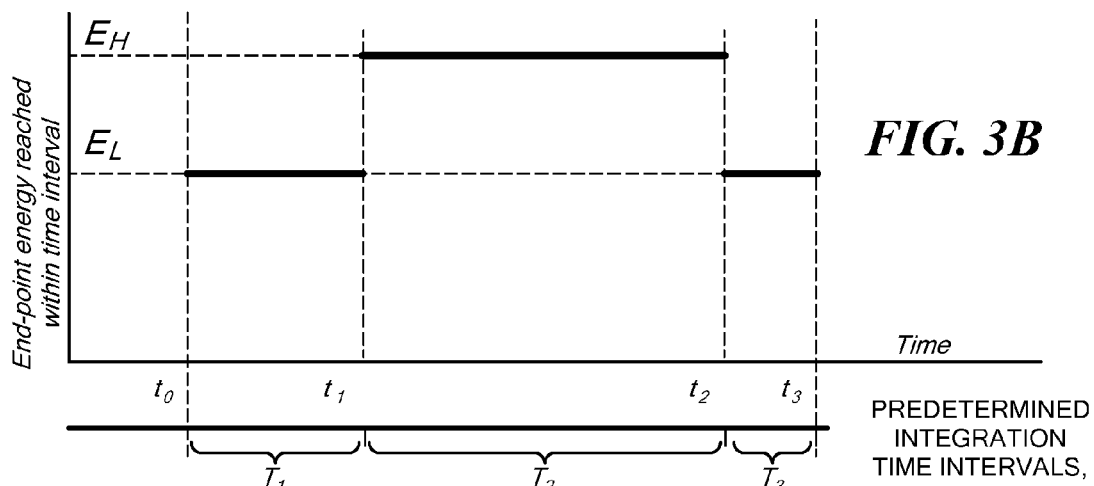

Accordingly, the non-stationary energy spectrum and beam intensity, as a function of time, may be used, in conjunction with one or more detectors, to obtain measurements under distinct energetic conditions, as now described with reference to FIGS. 3A-3C. FIG. 3A shows a plot of the dose rate from a linac-based X-ray source used in practicing embodiments of the present invention, shown as a function of time, over a period of several microseconds. FIG. 3B depicts predetermined time intervals associated with low- and high-end-point energies ($E_L$ and $E_H$, respectively) in a dual-energy scenario in accordance with one embodiment of the present invention. The times $t_i$ shown, and the corresponding integration intervals, or "bins", denoted $T_i$, are predetermined in accordance with certain embodiments of the present invention. In accordance with other embodiments of the invention, they may be determined on the basis of transmitted radiation levels, or signal-to-noise ratios, and, furthermore, may be determined on a pixel-by-pixel basis, or on the basis of identified regions of an inspected object.

Figure 3C:
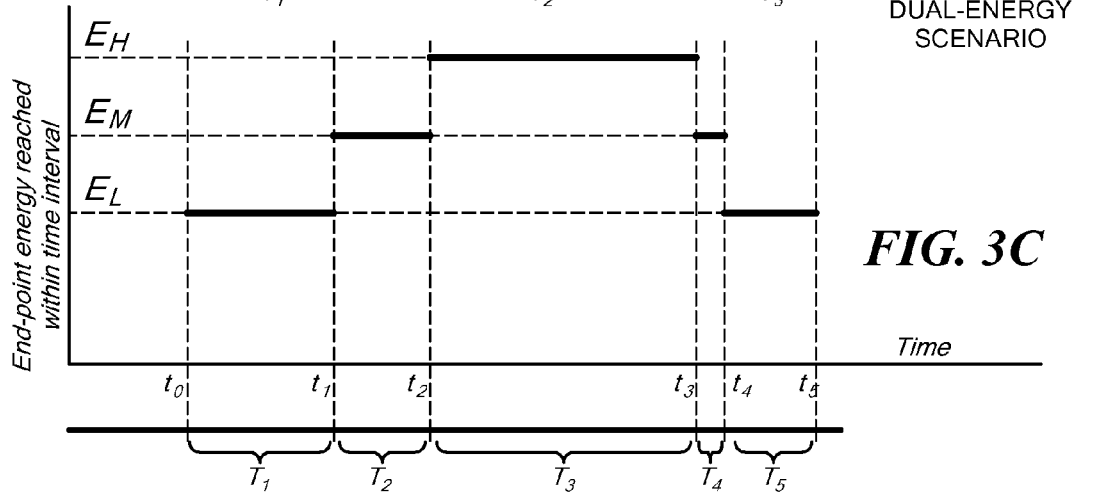
FIG. 3C depicts exemplary predetermined integration time intervals for low-, middle- and high-end-point energies in a triple-energy scenario, in accordance with the same or another embodiment of the present invention.

FIG. 3C depicts exemplary predetermined integration time intervals for low-, middle- and high-end-point energies ($E_L$, $E_M$, and $E_H$, respectively) in a triple-energy scenario, in accordance with the same, or another, embodiment of the present invention.

Figure 4:
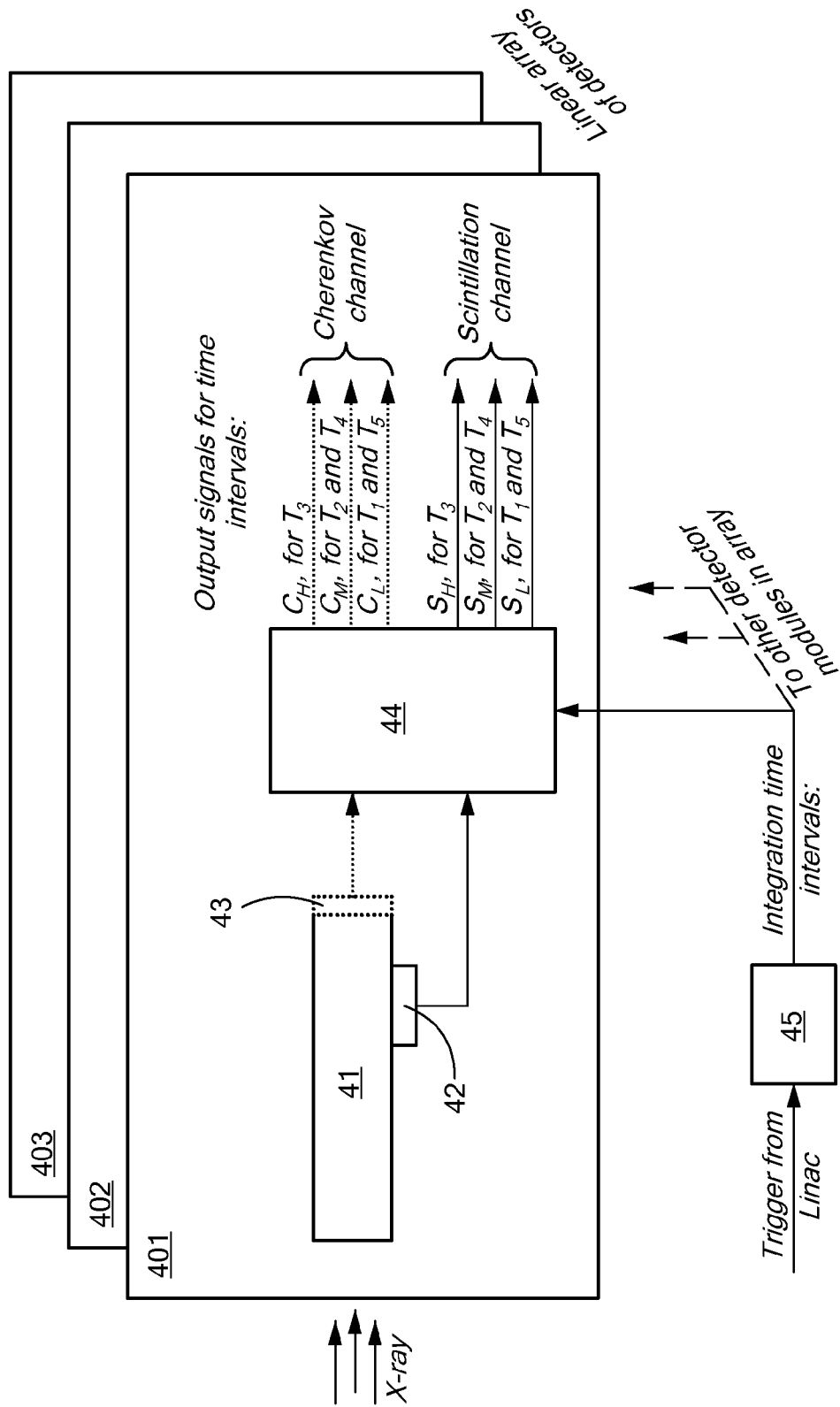
FIG. 4 depicts a schematic diagram of x-ray detectors and detection electronics in accordance with embodiments of the present invention.

If one detector is used, energy discrimination is obtained on the basis of temporal resolution. Gating the detector signal (integrating over "bins") allows discrimination among periods of different spectral content. If two or more detectors are used, the detectors may, additionally, exhibit differential energy sensitivity, however not all embodiments of the invention require that they do so. In accordance with one scenario, provided solely by way of example, and described with reference to FIG. 4, multiple detector signals are obtained, whether from one detector or from two or more detectors, or, as depicted in FIG. 4, from conversion of absorbed X-rays into light in a single detector crystal element 41. Light emitted as X-rays propagate through crystal 41 may arise due to distinct physical processes, and may be detected in different modalities, as by distinct photodetectors 42 and 43 for detection in scintillation and Cherenkov channels, respectively. By means of timing electronics, depicted generally by numeral 44 in FIG. 4, one or more detectors are gated to integrate the signals of one or more detector channels during specified portions of the applied x-ray pulse, with an example of the specified integration intervals corresponding to FIG. 3C. It is to be noted that two detector channels and three integration bins corresponding to L, M, and H energy ranges are shown in FIG. 4 by way of example only, and that any number of detectors greater than or equal to one may be employed. Temporal gating is achieved by timing electronics 44 relative to a trigger input to timer 45 from the linac or other source.

In FIG. 4, additionally, stacked detector modules are designated by numerals 401, 402, and 403, each pertaining to a distinct pixel element in the detector array. Various detectors and detector modules may be employed for detection of penetrating radiation that has traversed the inspected object. Examples are a scintillation detector comprising a lead-tungstate ($PbWO_4$) crystal 41 and a photodetector 42, a Cherenkov detector comprising a lead-tungstate crystal 41 and a photodetector 43, or a detector configured to detect and discriminate scintillation and Cherenkov radiation, as described in U.S. Provisional Patent Application Ser. No. 61/267,227, "Scintillation-Cherenkov Detector and Method for High Energy X-Ray Cargo Container Imaging and Industrial Radiography," filed Dec. 7, 2009, appended hereto, and incorporated herein by reference. In order to obtain sufficiently time-resolved data, fast detectors are preferred, such as $PbWO_4$ or CsI, exhibiting decay times as short as 30 ns. Direct conversion detectors may also be employed, in accordance with further embodiments of the present invention. Other detectors, based, for example, on bismuth germinate (BGO) crystals, are less desirable for certain embodiments of the invention.

Figure 5:
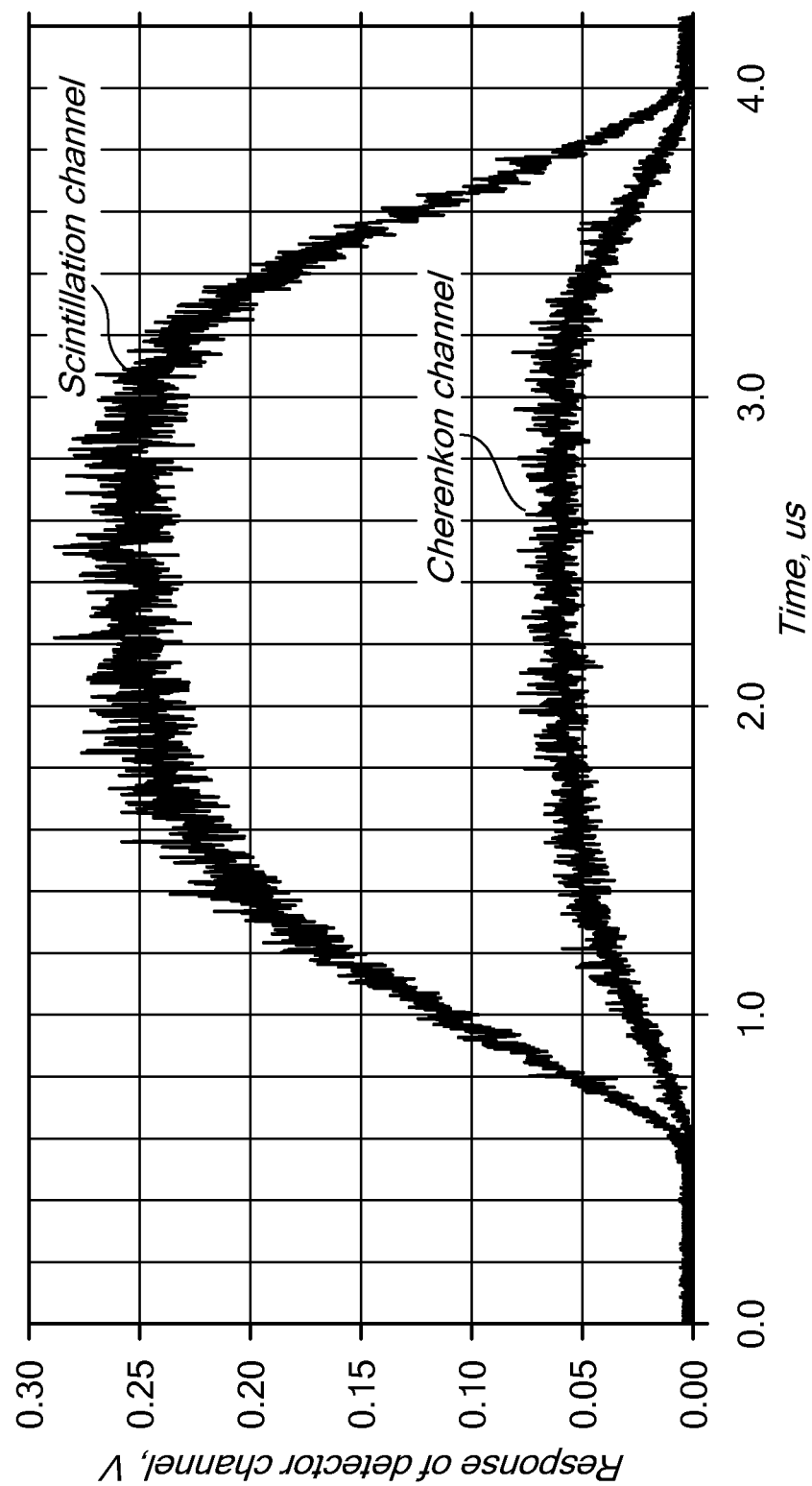
FIG. 5 shows temporal plots of measured scintillation and Cherenkov channel responses of a $PbWO_4$ crystal detector to 6 MeV single-energy linac pulse that has traversed a 10-cm steel object.

FIG. 5 shows temporal plots of measured scintillation and Cherenkov channel responses of a PbWO$_4$ crystal detector to 6 MeV single-energy linac pulse that has traversed a 10-cm steel object.

Figure 6A:
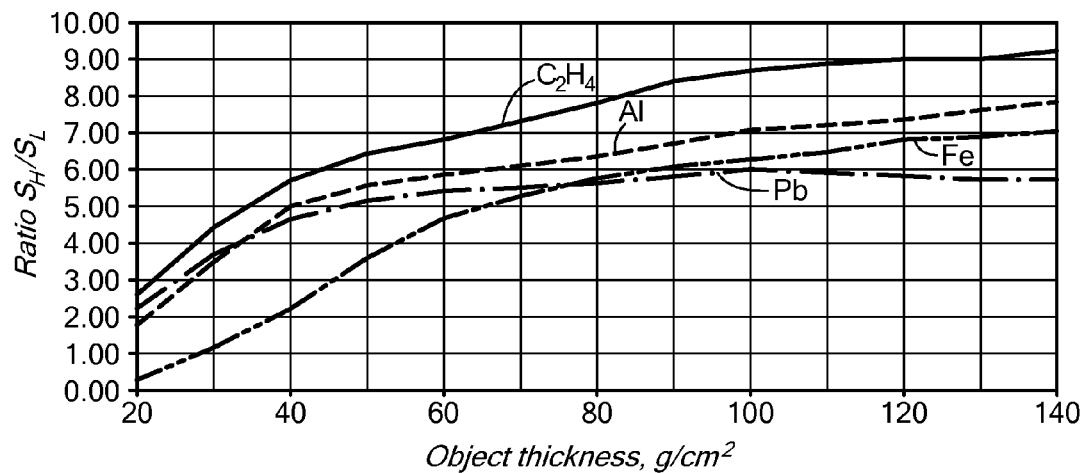
FIG. 6A shows measured ratios of $S_H/S_L$ for four distinct materials as a function of material thickness, using a 6 MeV single energy Linac and a $PbWO_4$ detector, in a scintillation channel.
Figure 6B:
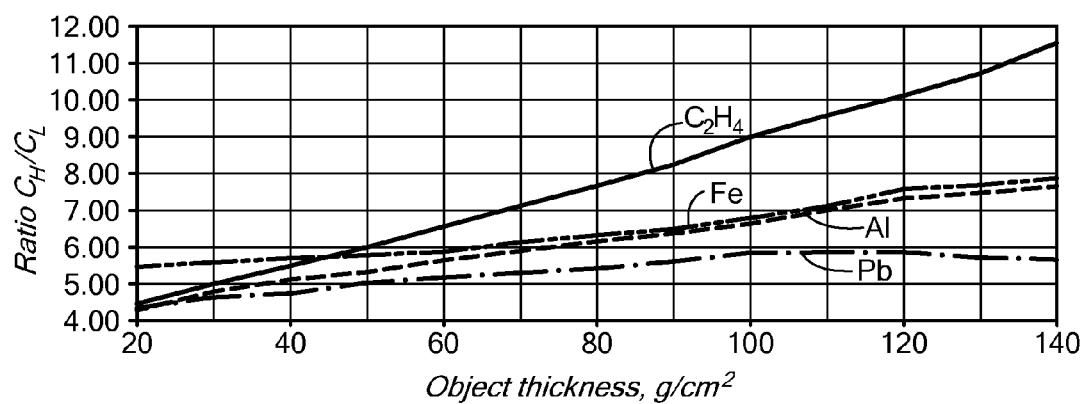
FIG. 6B shows corresponding ratios of $C_H/C_L$ for the same materials as a function of material thickness, using a 6 MeV single energy Linac and a $PbWO_4$ detector, Cherenkov channel, with all measurements performed in accordance with embodiments of the present invention.
Figure 7:
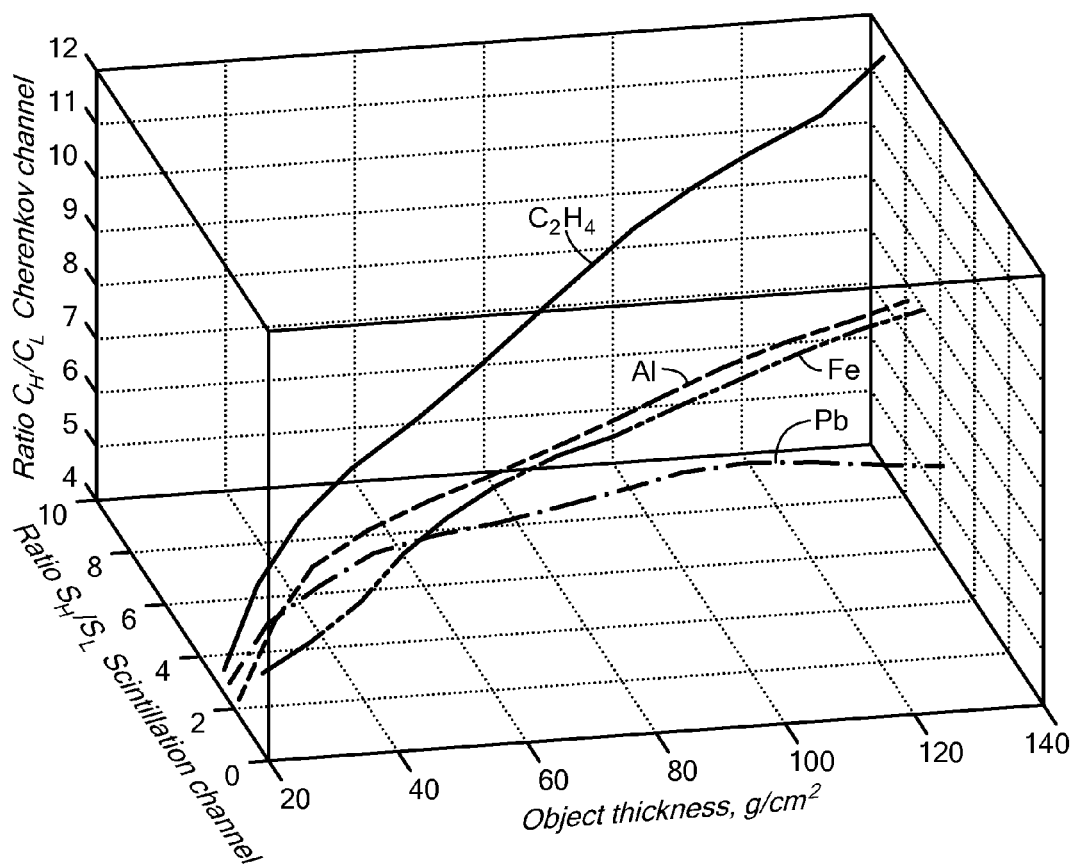
FIG. 7 shows a combined 3D plot of measured ratios of $C_H/C_L$ and $S_H/S_L$ for four distinct materials as a function of material thickness, employing methods of the present invention.
Figure 8:
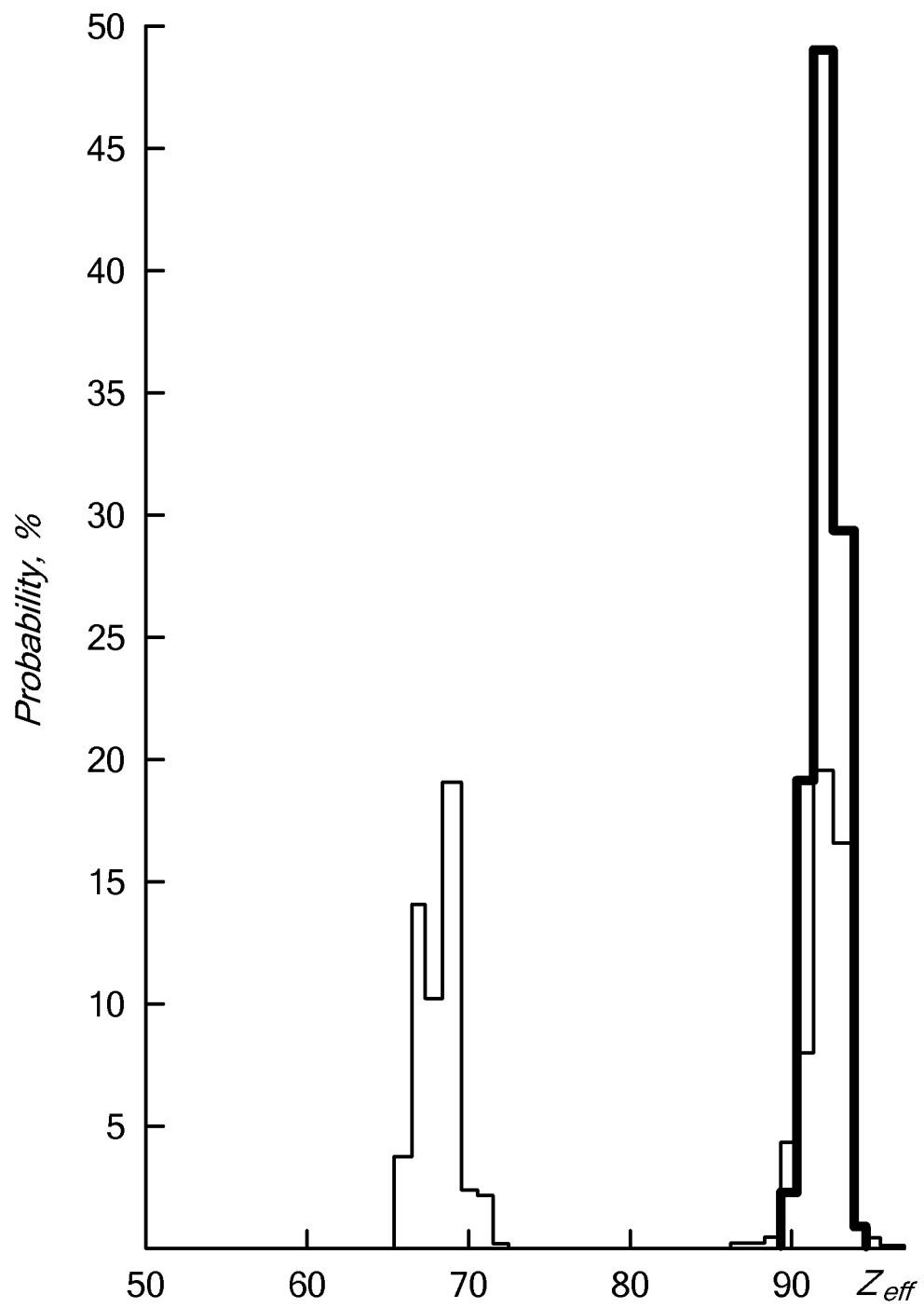
FIG. 8 depicts distributions of the probability of determining $Z_{eff}$ for a uranium object 4.5×4.5×4.5 $cm^3$ in size, simulated for prior art double end-point energy (thin line) and triple end-point energy (bold line) methods.

FIG. 6A shows measured ratios of $S_H/S_L$ for four distinct materials as a function of material thickness, using a 6 MeV single energy Linac and a PbWO$_4$ detector, in a scintillation channel. FIG. 6B shows corresponding ratios of $C_H/C_L$ for the same materials as a function of material thickness, using a 6 MeV single energy Linac and a PbWO$_4$ detector, Cherenkov channel. In FIG. 7, a combined 3D plot shows measured ratios of $C_H/C_L$ and $S_H/S_L$ for four distinct materials as a function of material thickness, using a 6 MeV single energy Linac and a PbWO$_4$ scintillation-Cherenkov detector.

In accordance with embodiments of the present invention, fast detectors—as defined above—allow resolution of the temporal profile of the detector response to a radiation pulse which may be characterized by an end-point energy that ramps up in time. Different time intervals of the detector response correspond to different end-point energies and can be used for material discrimination. The time intervals for acquiring the detector response and thus the accumulated energy spectra need not be predetermined but can be chosen during or after the measurement based on the observed detector response. A software algorithm adapts the measurement intervals for each detector element to match the attenuation of the object under interrogation. By automatically selecting the most effective measurement conditions the system delivers better dynamic range and the best possible material discrimination.

Embodiments of the present invention extend the teachings of provisional US patent application "System and Methods for Multi-energy X-ray Cargo Inspection," filed Oct. 18, 2010, which is appended hereto, and incorporated herein by reference. Whereas the earlier description taught predetermined, fixed time intervals for acquiring the detector response, present teachings provide, instead, for choosing the intervals based on the observed detector response. This allows adapting the accumulated energy spectra for each individual detector element to attenuation levels that are actually encountered, which makes it particularly suitable for X-ray inspection scenarios where radiation thicknesses vary over several orders of magnitude over the lengths or area of the detector array. By adapting accumulated energy spectra it is possible to extend the dynamic range of the detection system and, more importantly, optimize the material discrimination performance on a per pixel basis.

Figure 9:
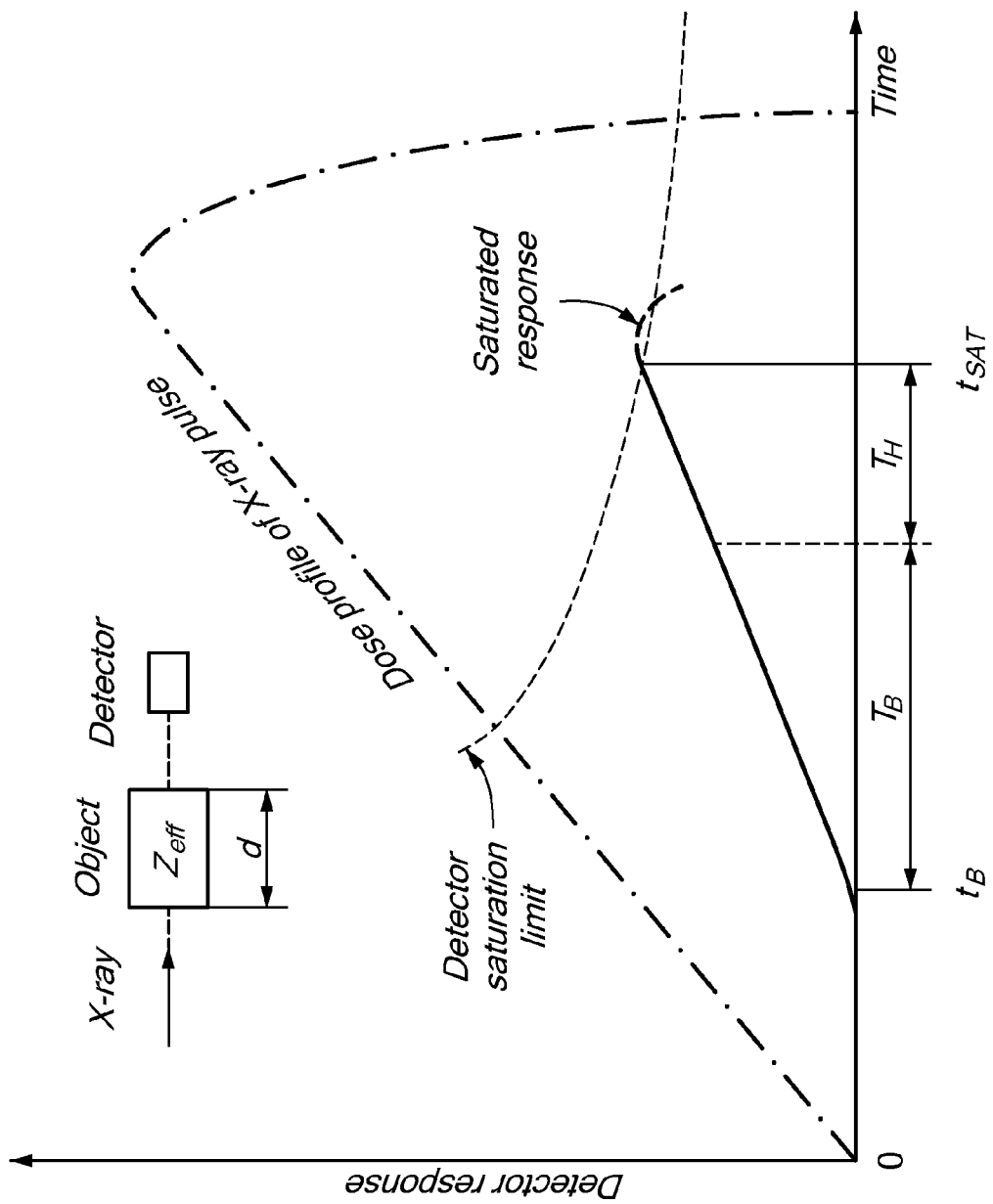
FIG. 9 plots detector response to an attenuated ramped-energy X-ray pulse.

An example of the temporal response of a fast detector to a pulse of ramped end-point energy is plotted in FIG. 9. Until time $t_B$ there is no detector response because the pulse does not yet contain X-ray photons of sufficient energy to penetrate the attenuating object. Once a penetrating end-point energy is reached the detector response starts increasing along with the increasing end-point energy of the X-ray pulse. At time $t_{SAT}$ the detector reaches saturation. The saturated detector response depends on the particular detector design and is only indicated in the figure as an example. For a given X-ray pulse and detector the times $t_B$ and $t_{SAT}$ depend only on the thickness d of the attenuating object and its material composition characterized by the effective atomic number $Z_{eff}$.

To derive a low and a high energy signal value from the acquired detector response two time intervals, $T_L$ and $T_H$, can be chosen. The detector response during $T_L$ is accumulated into a signal value characterized by a lower end-point energy, the response during $T_H$ into a signal of higher end-point energy. The two signal values can be used for material discrimination as in the before mentioned dual energy approach. Alternatively, the times $t_B$ and $t_{SAT}$ or threshold crossing times can be used as they contain similar information.

Figure 10:
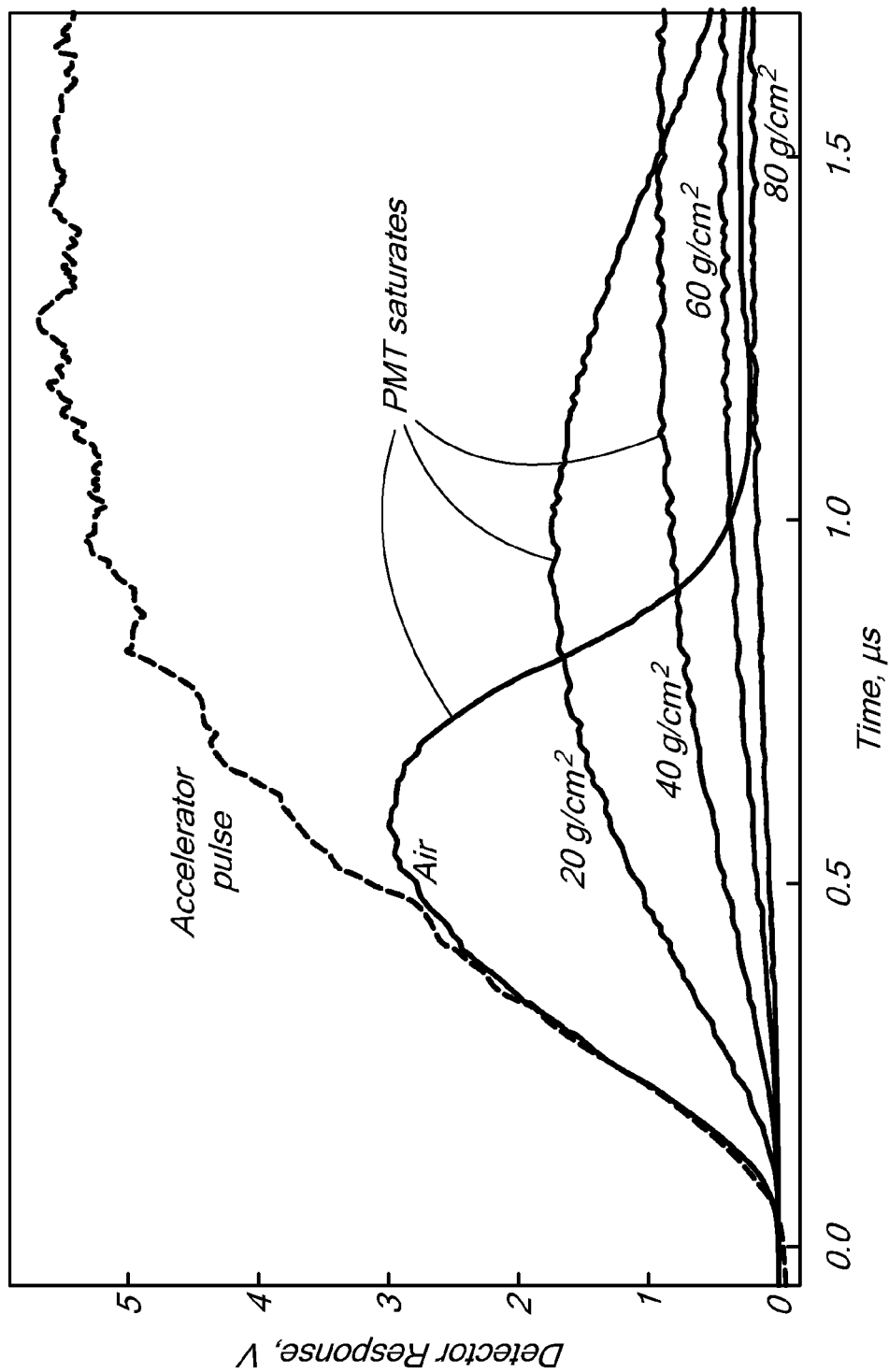
FIG. 10 depicts examples of measured detector response to a 6 MeV X-ray pulse depicted by the dashed line.

Examples of measured detector responses are plotted in FIG. 10, with a 6 MeV X-ray accelerator pulse depicted by the dashed line. For the three lower attenuations the detector reaches saturation. The saturation behavior which is shown is typical for a fast detector that uses a photomultiplier tube (PMT).

Figure 11B:
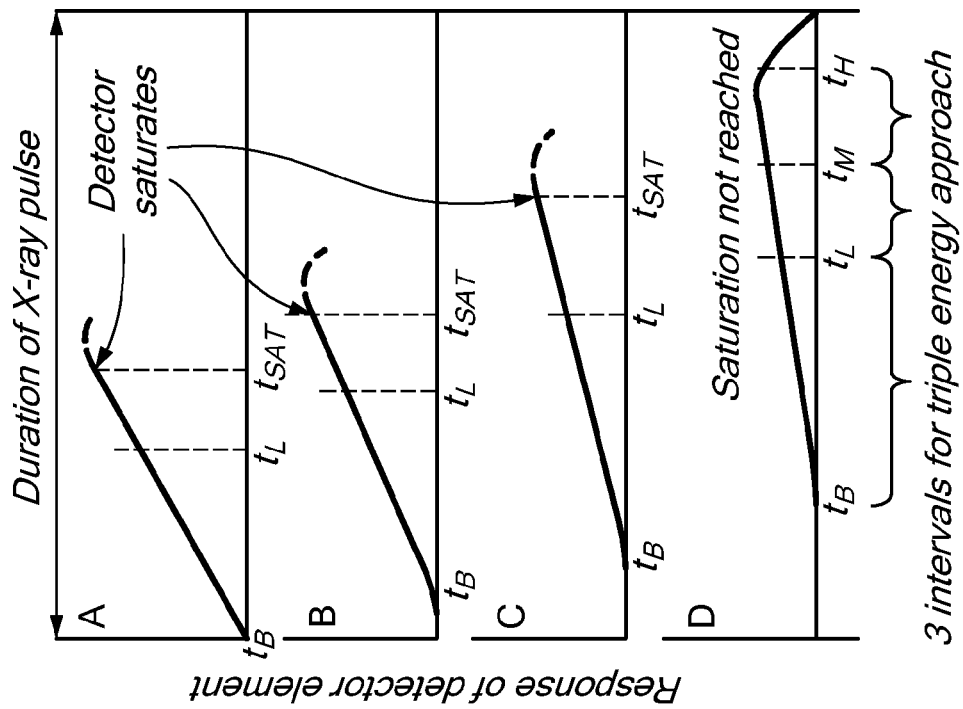
FIG. 11A shows several detector placements relative to an inspected cargo vehicle, while FIG. 11B compares expected detector responses for different attenuation scenarios, in accordance with an embodiment of the present invention.
Figure 11A:
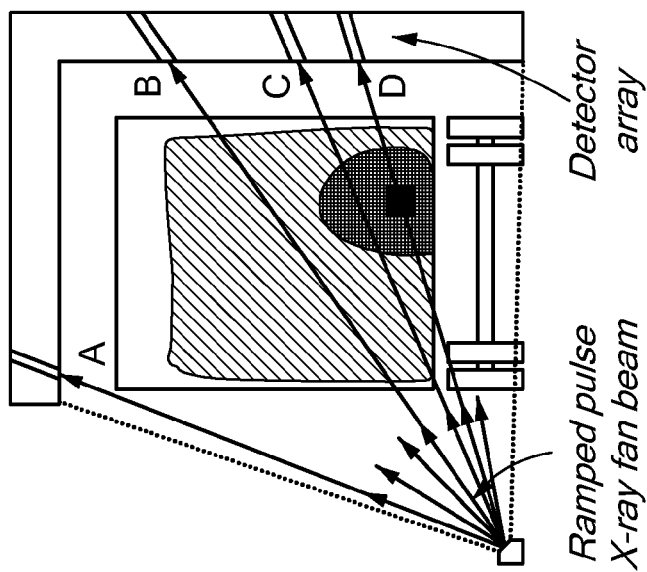

For detector elements A, B, C and D, disposed relative to a cargo containing an attenuating object, as shown in FIG. 11A, various scenarios relate to the respective detectors and are plotted in FIG. 11B. The radiation path to detector element A encounters no attenuating object, therefore detector A shows a response immediately with the beginning of the X-ray pulse and reaches saturation relatively early. The radiation path to detector element B passes cargo with moderate attenuation; the detector shows a delayed response and reaches saturation later than detector element A. The radiation path to detector element C passes through heavy cargo with strong attenuation; the detector response is delayed further and saturation is reached late. The radiation path to detector element D passes through very heavy cargo like lead or special nuclear material (SNM) which attenuates very strongly. The detector response is delayed even further than for element C's, and saturation is never reached. In this case the aforementioned Z-ambiguity can arise during dual energy analysis and a triple energy approach may be required to resolve it. A choice of possible time intervals for triple energy analysis is indicated in the lower right. In accordance with embodiments of the present invention, processor 19 (shown in FIG. 1A) may adapt the operation of detector modules 18, varying time intervals, integration times, etc., during the course of operation, in anticipation of operation, or otherwise. Thus, rather than using preset integration times, binning may be responsive to operational characteristics, such as the degree of attenuation in inspected cargo. Such adaptation may be provided on the basis of individual detector elements.

Figure 12:
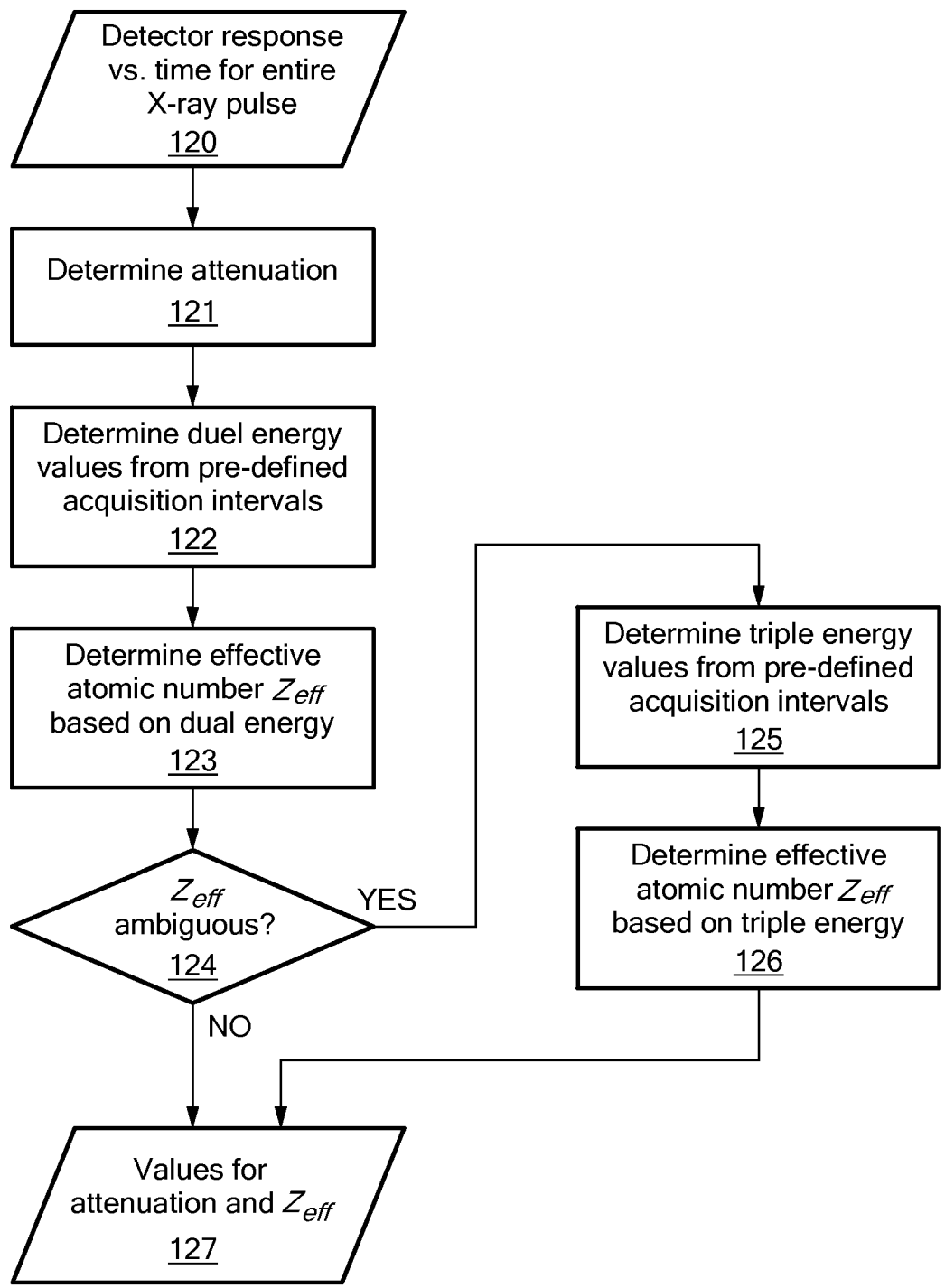
FIG. 12 is a flowchart depicting a process for intrapulse multi-energy X-ray inspection in accordance with embodiments of the present invention. The default algorithm to determine $Z_{eff}$ uses the dual energy approach. If the resulting $Z_{eff}$ is found to be ambiguous, a triple energy approach is employed.

FIG. 12 depicts a flowchart of an analysis algorithm in accordance with an embodiment of the present invention. It is to be understood that an alternative process depicted in FIG. 13 may be practiced on a pixel-by-pixel basis, as the signal is acquired. The detector response is acquired as a function of time for the entire X-ray pulse (120). On that basis, the attenuation is determined (121) for the line of sight through the inspected object to the pixel under analysis. Dual energy values, corresponding to predetermined acquisition intervals are calculated (122), and a material characteristic, such as $Z_{eff}$ is calculated (123) based on dual energy.

The default algorithm is to determine $Z_{eff}$ uses the dual energy approach. But, if the resulting $Z_{eff}$ is found to be ambiguous (124), a triple energy approach is employed (125). Based on a rebinning of the data such as to provide triple energy values, the ambiguity may be resolved and $Z_{eff}$ determined (126). Thus, values for attenuation and $Z_{eff}$ are determined (127) and provided for further processing and display.

Figure 13:
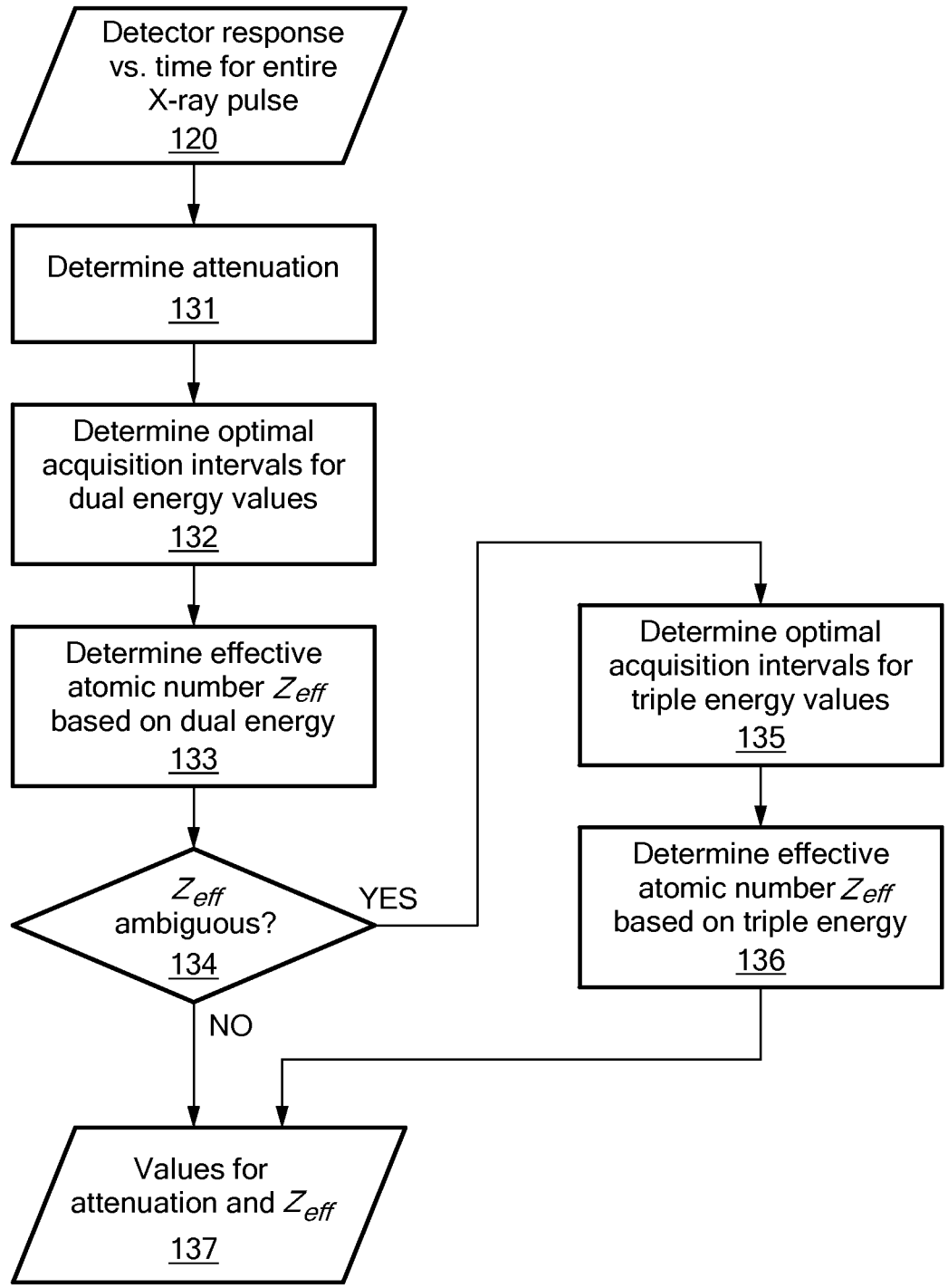
FIG. 13 is a flowchart depicting an alternate process for intrapulse adaptive multi-energy X-ray inspection in accordance with embodiments of the present invention. If the resulting $Z_{eff}$ is found to be ambiguous, a triple energy approach is employed.

FIG. 13 depicts a flowchart of an analysis algorithm analogous to FIG. 12, in which the timing of the acquisition intervals is not predetermined but chosen during or after the measurement based on the observed detector response. In the process of FIG. 13, the detector response is acquired as a function of time for the entire X-ray pulse (130). On that basis, the attenuation is determined (131) for the line of sight through the inspected object to the pixel under analysis. Optimal acquisition intervals for dual energy values are calculated (132), and a material characteristic, such as $Z_{eff}$ is calculated (133) based on dual energy.

The default algorithm is to determine $Z_{eff}$ uses the dual energy approach. But, if the resulting $Z_{eff}$ is found to be ambiguous (134), a triple energy approach is employed and optimal acquisition intervals for triple energy values are determined (135). Based on a rebinning of the data such as to provide triple energy values, the ambiguity may be resolved and $Z_{eff}$ determined (136). Thus, values for attenuation and $Z_{eff}$ are determined (137) and provided for further processing and display.

It is to be noted that the methods of the present invention are not limited to high energy X-ray sources like linear accelerators nor does the change in end-point energy and flux have to be linear or positive. The method can be employed for any radiation source which exhibits a ramping behavior, or any characterized variation of spectrum as a function of time.

As defined above, the detector response time of a "fast" detector is much smaller than the duration of the X-ray pulse so the detector can resolve the temporal profile of the ramped-energy X-ray pulse. For scintillation detectors, fast detection requires a short decay time of the scintillator. For direct conversion detectors, a short charge collection time is required in order for a detector to be fast. The detector electronics needs to have equivalent bandwidth.

While the invention described herein pertains to any penetrating radiation, it may be described, purely as a matter of heuristic convenience, in terms of X-rays. In preferred embodiments, the detector response is recorded for the entire duration of the X-ray pulse. Then, a signal processing unit analyzes the detector response and determines the acquisition intervals best suited for imaging and material discrimination. This decision may be derived from a calibrated look-up table or based on a formula. The resulting value for the chosen acquisition intervals can be obtained by integrating over the detector response or by photon counting. Photon counting is advantageous for lower intensities, as it allows rejecting scatter contributions based on the discernable energy of the individually detected X-ray photons. A Cherenkov or a Scintillation-Cherenkov detector allows rejecting scatter contributions also in integration mode based on its energy discriminating characteristic.

Once an effective Z value has been determined, it may be possible to refine the acquisition periods. The result will be a Z value with better accuracy and/or confidence. This process may be iterated if necessary. If the dual energy analysis leads to a Z ambiguity as discussed by Ishkhanov et al. (2008) and Ogorodnikov et al. (2002), it is possible to perform an analysis based on three or more energy intervals and resolve the ambiguity.

In accordance with alternative embodiments of the present invention, the detector response is compared to predetermined threshold values and the times needed to reach those thresholds are recorded. At a minimum, two thresholds are needed to allow material discrimination. The time needed to reach each threshold is characteristic for the attenuation at the corresponding end-point energy. A combination of two or more threshold times allows assessing the amount of beam hardening and thus material discrimination.

Insofar as any "signal" obtained prior to onset $t_0$ of the incident pulse consists entirely of noise, and insofar as signal derived after detector saturation may similarly degrade signal-to-noise, the essential part of the signal, from onset to saturation, may be extracted, in accordance with embodiments of the present invention, with the interval adapted in real time, or in post-processing, on a detector-by-detector basis.

While the description herein has been in terms of "integration" of a signal, it is to be understood that "integration" includes cumulative pulse counting, where appropriate.

Where examples presented herein involve specific combinations of method acts or system elements, it should be understood that those acts and those elements may be combined in other ways to accomplish the same objective of x-ray inspection. Additionally, single device features may fulfill the requirements of separately recited elements of a claim. The embodiments of the invention described herein are intended to be merely exemplary; variations and modifications will be apparent to those skilled in the art. All such variations and modifications are intended to be within the scope of the present invention as defined in any appended claims.

What is claimed is:

1. A method for x-ray inspection of an object, the method comprising:
    a. generating a temporal sequence of pulses of X-ray radiation, each pulse characterized by an onset and by a spectral content that evolves with time subsequent to the onset;
    b. forming the pulses of penetrating radiation into a beam scanned across the object;
    c. detecting penetrating radiation from the beam that has traversed the object and generating a detector signal; and
    d. processing the detector signal to derive at least one material characteristic of the object on a basis of temporal evolution of the detector signal of at least one pulse of the sequence of pulses.

2. A method in accordance with claim 1, wherein detecting X-ray radiation includes distinguishing signal acquired during distinct time intervals of each pulse.

3. A method in accordance with claim 2, wherein the distinct time intervals of each pulse are tailored in correspondence to distinct spectral content of the pulses of X-ray radiation.

4. A method in accordance with claim 2, wherein the distinct time intervals are predetermined prior to operation.

5. A method in accordance with claim 2, wherein the distinct time intervals are determined adaptively during operation.

6. A method in accordance with claim 5, wherein the selection of time intervals is modified in response to an ambiguity in a determination of a material characteristic.

7. A method in accordance with claim 2, wherein the distinct time intervals are based on a threshold value of the detector signal.

8. A method according to claim 2, wherein processing the detector signal includes integrating the detector signal separately over the distinct time intervals of each pulse.

9. A method according to claim 2, wherein processing the detector signal includes photon counting.

10. A method according to claim 2, wherein processing the detector signal includes acquiring threshold crossing times.

11. A method in accordance with claim 2, wherein the intervals of time are selected to provide two energy bins.

12. A method in accordance with claim 2, wherein the intervals of time are selected to provide three energy bins.

13. A method in accordance with claim 1, wherein detecting includes preprocessing of the detector signal.

14. A method in accordance with claim 1, wherein detecting includes deriving a plurality of detector signal channels.

15. A method in accordance with claim 1, wherein the pulses of penetrating radiation are characterized by an end-point energy in a range up to 10 MeV.

16. A method in accordance with claim 1, wherein the step of generating a temporal sequence of pulses is performed by an accelerator.

17. A method in accordance with claim 1, wherein the step of detecting penetrating radiation is performed at least by one scintillation detector.

18. A method in accordance with claim 1, wherein the step of detecting penetrating radiation is performed at least by one direct conversion detector.

19. A method in accordance with claim 1, wherein the step of detecting penetrating radiation is performed at least by one Cherenkov detector.

20. A method in accordance with claim 1, wherein the step of detecting penetrating radiation is performed at least by one detector responsive to both Cherenkov and scintillation light.

21. A method in accordance with claim 1, wherein the specified characteristic is chosen from a group of material characteristics of the object comprising an effective atomic number and an electron density.

22. A method in accordance with claim 1, further comprising determining at least one time during an acquired detector signal corresponding to a predetermined threshold.

23. A method in accordance with claim 1, wherein the step of processing is performed for a plurality of detectors on a detector-by-detector basis.

24. An X-ray inspection apparatus comprising:
a. an X-ray source configured to generate a temporal sequence of pulses of penetrating radiation, during a course of each of which spectral content evolves with time subsequent to an onset;
b. a detector for detecting penetrating radiation from the beam that has traversed the object and for generating a detector signal; and
c. a processor configured to receive the detector signal and derive at least one material characteristic of the object on a basis of temporal evolution of the detector signal of at least one pulse of the sequence of pulses.

25. An X-ray inspection apparatus according to claim 24, wherein the X-ray source is a linac.

26. An X-ray inspection apparatus in accordance with claim 24, further comprising a plurality of detector elements.

27. An X-ray inspection apparatus in accordance with claim 24, each pulse of penetrating radiation includes an energetically monotonic ramp.

28. An X-ray inspection apparatus in accordance with claim 24, wherein the detector further comprises a preprocessor for distinguishing signal acquired during distinct time intervals of each pulse.

* * * * *